(12) United States Patent
Park et al.

(10) Patent No.: US 9,735,845 B2
(45) Date of Patent: Aug. 15, 2017

(54) PARALLEL PROCESSING IN A DISTRIBUTED ANTENNA SYSTEM

(71) Applicant: LG ELECTRONICS INC., Seoul (KR)

(72) Inventors: Kyungmin Park, Seoul (KR); Jiwon Kang, Seoul (KR); Kitae Kim, Seoul (KR); Kilbom Lee, Seoul (KR); Heejin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/159,260

(22) Filed: May 19, 2016

(65) Prior Publication Data

US 2016/0344513 A1    Nov. 24, 2016

Related U.S. Application Data

(60) Provisional application No. 62/164,501, filed on May 20, 2015.

(51) Int. Cl.
*H04B 7/0413*    (2017.01)
*H04L 1/00*    (2006.01)

(52) U.S. Cl.
CPC ......... *H04B 7/0413* (2013.01); *H04L 1/0045* (2013.01)

(58) Field of Classification Search
CPC ... H04L 1/0054; H04L 25/067; H04L 1/0045; H04B 7/0413; H04B 7/0404; H04W 72/082; H04W 88/02
See application file for complete search history.

(56) References Cited

U.S. PATENT DOCUMENTS

| | | | | |
|---|---|---|---|---|
| 2012/0254703 A1* | 10/2012 | Rubin | ................... | H04L 1/0046 714/784 |
| 2013/0007554 A1* | 1/2013 | Chen | ................... | H03M 13/1128 714/752 |
| 2013/0242899 A1* | 9/2013 | Lysejko | ................... | H04L 1/004 370/329 |
| 2014/0297220 A1* | 10/2014 | Raffa | ................... | B60N 2/002 702/150 |
| 2015/0082133 A1* | 3/2015 | Cao | ................... | G06F 11/1004 714/807 |

* cited by examiner

*Primary Examiner* — Syed Haider

(74) *Attorney, Agent, or Firm* — Birch, Stewart, Kolasch & Birch, LLP

(57) ABSTRACT

The present document is for a wireless communication with reduced internal signaling burden in the distributed antenna system (DAS). In the proposed method, a user equipment (UE) receives a decoding unit, from the network, by multiple distributed unit (DUs) distributed within the UE, and decodes the decoding unit, at each of the multiple DUs. Each of the multiple DUs reports first information on the decoding result to a central unit (CU) controlling the multiple DUs, and the CU determines decoded bit values of the decoding unit based on the first information acquired from each of the multiple DUs.

10 Claims, 11 Drawing Sheets

(a)

(b)

PARALLEL PROCESSING IN A DISTRIBUTED ANTENNA SYSTEM

CROSS REFERENCE

This application claims the benefit of the U.S. Provisional Patent Application No. 62/164,501, filed on May 20, 2015, which is hereby incorporated by reference as if fully set forth herein.

BACKGROUND OF THE INVENTION

Technical Field

The present document is for a wireless communication system. More particularly, the present document is for a wireless communication with reduced decoding time in the distributed antenna system (DAS) by applying parallel processing.

While the present document mainly discuss this with the example of implementing in-vehicle DAS system, it is only exemplary, and the proposed scheme/structure can be used for other configuration of MIMO system with DAS configuration.

Discussion of the Related Art

In the conventional mobile communication system for mainly serving personal mobile communication devices, there is an inverse proportional relationship between the speed of the UE and required data rate/QoS. So, the conventional communication system is configured to provide high data rate/QoS for low speed UE, and to provide reliable service without radio link failure for the high speed UE even the data rate/QoS is somewhat low.

In the next generation communication system, there is a need for high data rate/QoS for the high speed UE, since the scope of the required service increase. For example, the users in the vehicle or public transportation would like to enjoy multi-media service during the drive through highway. Also, users want to enjoy multi-media service more while the speed of the vehicle is high.

In order to fulfil these needs, there can be two approaches. One is improving the network infra itself for high quality service to high speed users, and the other is a new system/scheme for this without affecting the network infra.

As one of the solution for the second approach, a vehicular MIMO system is considered. In conventional vehicular MIMO system, large size antenna arrays are implemented to the vehicle for this end. However, implementing the large size antenna array in the outside of vehicle has drawback for vehicle design and for aerodynamics. So, the vehicle vendors are reluctant to implement this kind of large antenna array. Presently, vendors prefer to use shark antenna system in their vehicle.

FIG. 1 shows a structure of conventional shark antenna system for vehicular communication.

The conventional shark antenna system is a combinational antenna system. As shown in FIG. 1, the shark antenna system implemented various antennas within one physical structure. In FIG. 1, the shark antenna includes combined structure for 4 or more different band/services in one antenna. So, it has limit for providing high quality mobile communication service.

However, the reason why the vendors prefer this instead of large antenna system is to reduce the space for the antennas. Large sized antennas would not good for car design and reduce the original driving performance of the vehicle.

SUMMARY OF THE INVENTION

Technical Problem

In order to solve this problem, the inventors of the present invention proposed to use the in-vehicular distributed antenna system (hereinafter, in-vehicle DAS system).

FIG. 2 shows a concept of in-vehicle DAS system implemented into a car.

As shown in FIG. 2, in-vehicle DAS system uses relatively small multiple antenna units distributed within the vehicle. Multiple antenna units may be hidden at each corner of the car as shown in FIG. 2, for example. These multiple antenna units can be referred to as 'DUs (Distributed Units)'. A CU (central unit) of in-vehicle DAS system can control each of DUs of the vehicle.

Since DUs are separated within the vehicle, the physical channel characteristics would be different and independent. This can provide diversity gain, but it can increase signaling overhead in order to consider each of the physical channel characteristics.

Also, in order to implement in-vehicle DAS system, additional consideration is required comparing to the conventional MIMO system.

FIGS. 3 and 4 show an example of required additional consideration for cell selection when in-vehicle DAS system is implemented.

In the conventional mobile communication system, the cell selection is performed when the signal strength of the received signal decreases and there is another cell with higher signal strength. That is, the cell selection is performed only based on the signal strength of each cell. But, when in-vehicle DAS system is implemented, it would be better to consider also the diversity of the ray for each DU.

In FIG. 3, a big truck is moving along with the vehicle in communication. If the speed of two cars is similar, the rays from a network in certain direction might be blocked for significant amount of time. It might degrade the quality of service for users in the vehicle. So, it would be better to consider also the diversity of rays when performing cell selection.

As shown in FIG. 4, the first cell (c0) is the closest cell providing the strongest signal, but it provides only one directional ray. But, the second cell (c1) provides various rays even its signal strength is somewhat lower than the first cell (c0). In this case, the second cell (c1) can be a better choice since the diversity in ray distribution provides more stable service as explained with FIG. 3.

So, in-vehicle DAS system may require additional consideration and the complexity increases.

Also, in the next generation mobile communication for in-vehicular communication, reducing processing time to decode the signals is one of the key issue.

FIG. 5 shows an example of parallel decoding to reduce the processing time according to LTE/LTE-A system.

As a high data rate is achieved, a receiving end has the burden of receiving much data within a shorter time and restoring a source by decoding the data. This burden appears as a phenomenon in which the number of transport blocks or the number of decoding units that should be decoded within a given time increases and the size of each transport block or decoding unit increases. Such variation means that a decoder should process a larger number of decoding units requiring more complicated decoding operations within a shorter time.

LTE and LTE-A systems which are currently commercially available communication systems use a segmentation and parallel decoding scheme in which a plurality of decoders simultaneously performs decoding, each of the decoders being in charge of a part of one decoding unit in order to maintain decoding delay at a proper level or less. As illustrated in FIG. 5, this structure reduces decoding delay but remarkably increases decoding complexity, as the number of parallel decoding blocks increases.

It is apparent that a future available communication system will have a greater data rate compared than the LTE system. In particular, in the case of vehicle communication, a vehicle serves to perform relay communication of a plurality of passengers in the vehicle or a plurality of devices mounted in the vehicle, thereby supporting a higher data rate than communication through other devices. Therefore, it is apparent that decoder complexity and decoding delay problems will be a main issue in configuration of the receiving end used for vehicle communication. If a decoder of the receiving end is implemented by a scheme of using a single decoder chip as in a legacy system but equipping a plurality of parallel decoding blocks in the chip, a data rate increases to 10 to 1000 times a data rate of a current LTE system. Therefore, the number of parallel decoding blocks should increase to more than 10 to 1000 times the number of decoding blocks of the current LTE system and decoder complexity increases to more than 10 to 1000 times current decoder complexity due to characteristics of some decoding algorithms (e.g., Viterbi) supporting high performance. As a result, decoding complexity of a level incapable of being implemented in reality may be demanded.

To solve the above problems, although a channel coding scheme having relatively low decoding complexity, such as a low density parity check (LPDC) coding scheme, may be used for future high data rate communication, it is expected that a problem of increasing decoding complexity relative to a currently available communication system will still occur.

Technical Solution

To achieve these and other advantages, a method for a user equipment (UE) to receive signals from a network, the method comprising: receiving a decoding unit, from the network, by multiple distributed unit (DUs) distributed within the UE; decoding the decoding unit, at each of the multiple DUs; reporting, by each of the multiple DUs, first information on the decoding result to a central unit (CU) controlling the multiple DUs; and determining, at the CU, decoded bit values of the decoding unit based on the first information acquired from each of the multiple DUs, is provided.

The first information may comprise log-likelihood ratio (LLR) of the decoding unit, and in this case, the CU may determine the decoded bit values of the decoding unit based on the LLRs of the decoding unit received from the multiple DU.

On the other hand, the first information may comprise reliability information of the decoding unit, and, in this case, the method may further comprise: determining, at the CU, an amount of traffic to be received from each of the DUs based on the reliability information; and reporting, by each of the multiple DUs, second information on the decoding result having the determined amount of traffic to the CU, and determining, at the CU, decoded bit values of the decoding unit based on the second information.

Here, the among of traffic to be received from each of the DUs can be determined by considering the reliability information, required minimum amount of data for determining the decoded bits, and a cable capability.

The second information on the decoding result having the determined amount of traffic may be log-likelihood ratio (LLR) of the decoding unit having different ranges based on the determined amount of traffic.

The second information on the decoding result having the determined amount of traffic may be log-likelihood ratio (LLR) of the decoding unit having different quantization size based on the determined amount of traffic.

In case one of the multiple DUs receives two or more decoding units from the network, the one of the multiple DUs may report the first information on the decoding result for each of the two or more decoding units to the CU, and wherein sizes of the first information for each of the two or more decoding units can be differently determined based on reliability information of each of the two or more decoding units.

The UE can be implemented on a motor vehicle, and the multiple DUs can be distributed within the motor vehicle.

The decoding unit may be one of a codeword or a layer of signals from the network.

In another aspect of the present invention, a user equipment (UE) comprising: multiple distributed units (DUs), each of which includes one or more integrated antennas to receive signals from a network and to decode the signals; and a central unit (CU) connected to the multiple DUs and controlling the multiple DUs, wherein each of the multiple DUs is configured to report first information on decoding result of a decoding unit of the received signals to the CU, and wherein the CU is configured to determine decoded bit values of the decoding unit based on the first information acquired from each of the multiple DUs, is provided.

Each of the integrated antennas may comprise an antenna component to receive the signals, and a processor for decoding the signals.

The CU can comprise a processor configured to determine the decoded bit values based on log-likelihood ratio (LLR) of the decoding unit acquired from the multiple DUs.

The first information may comprise reliability information of the decoding unit, and the CU may comprise a processor configured to determine an amount of traffic to be received from each of the DUs based on the reliability information.

The processor of the CU may be further configured to determine the decoded bit values of the decoding unit based on second information received from each of the multiple DUs having the determined amount of traffic.

Advantageous Effects

By using the above scheme, the processing time to decode the received signal can be significantly reduced. Also, signaling overhead between CU and DU can be reduced. So, it would make the cost of implementation lower than before.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

BRIEF DESCRIPTION OF THE DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other. Reference numerals in each drawing mean structural elements.

DETAILED DESCRIPTION OF THE INVENTION

Figure 1:
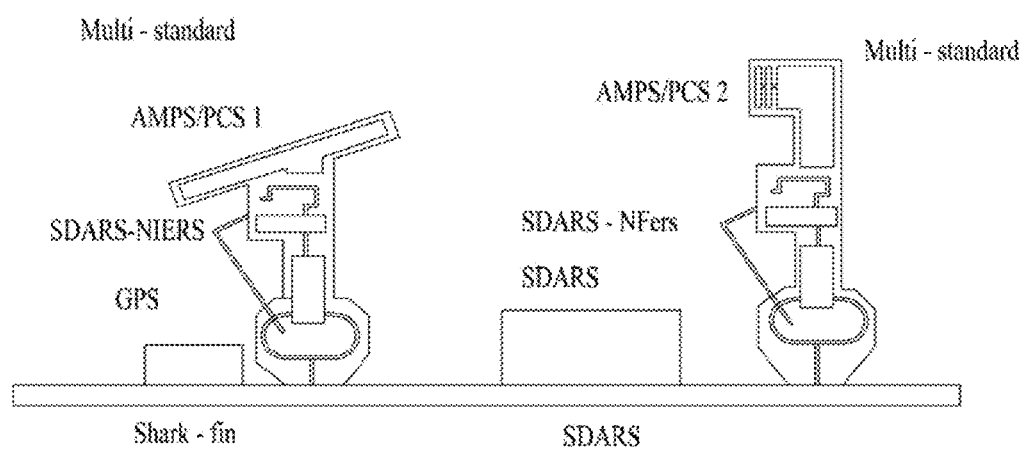
FIG. 1 shows a structure of conventional shark antenna system for vehicular communication.
Figure 2:
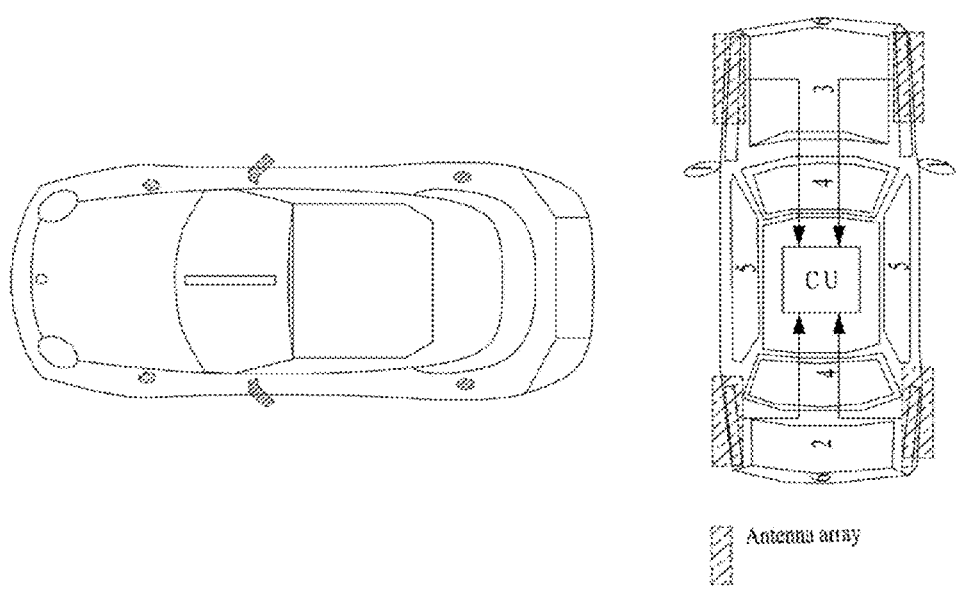
FIG. 2 shows a concept of in-vehicle DAS system implemented into a car.
Figure 3:
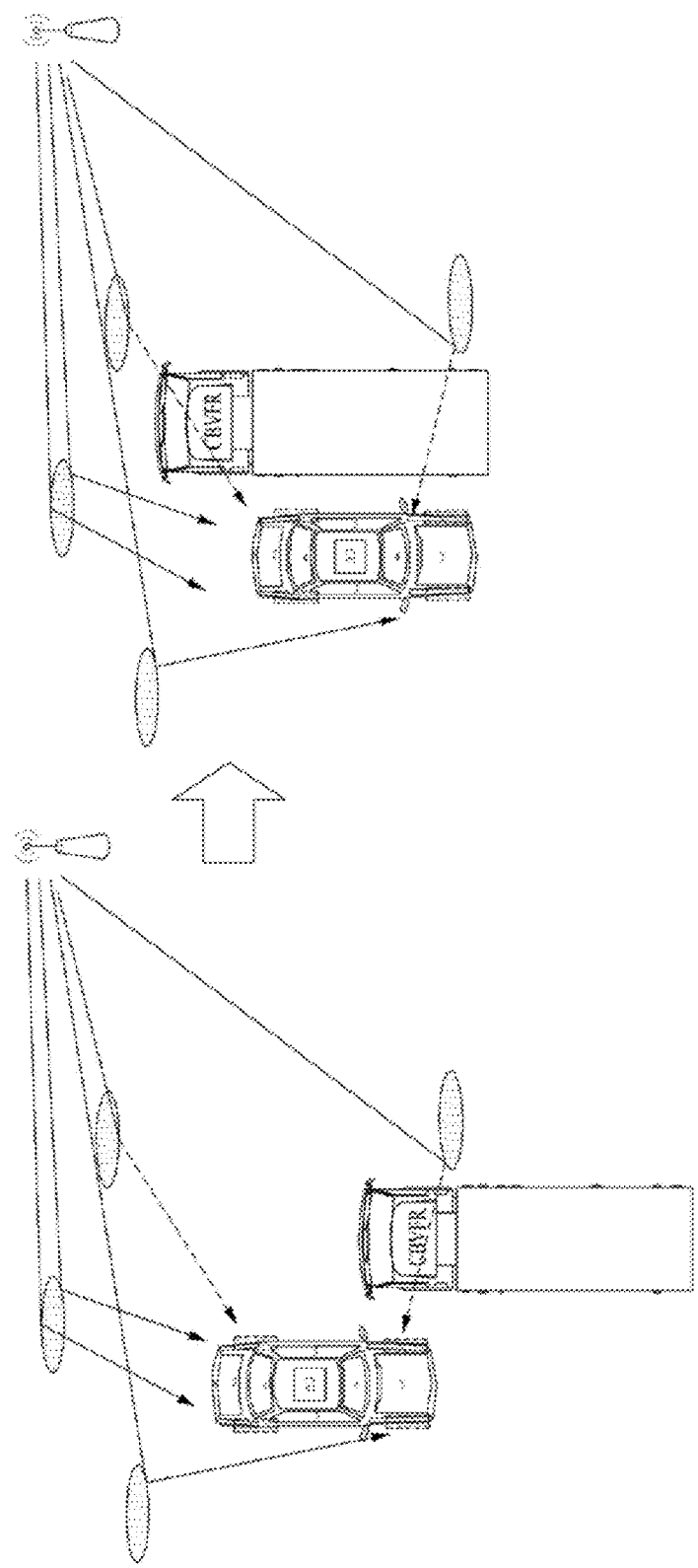
FIGS. 3 and 4 show an example of required additional consideration for cell selection when in-vehicle DAS system is implemented.
Figure 4:
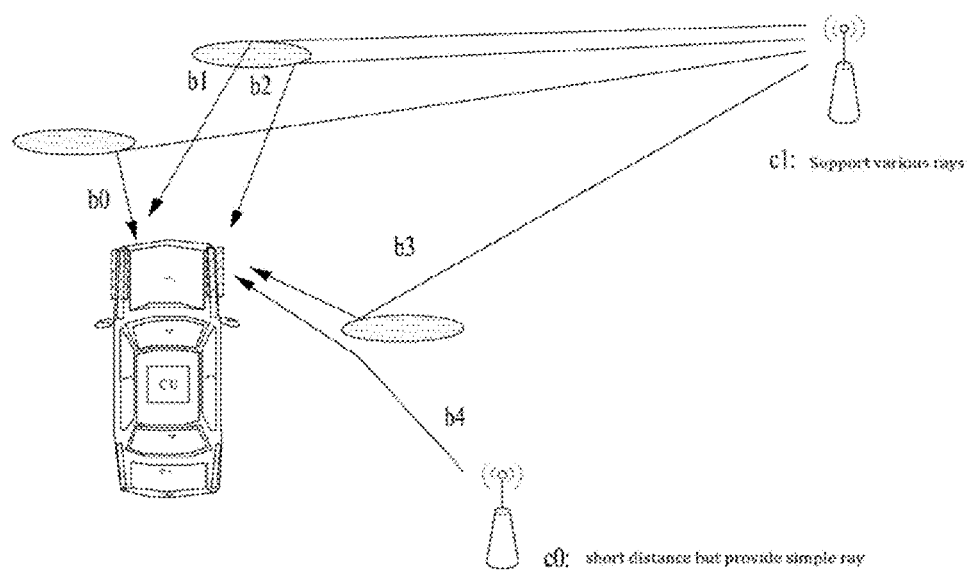
Figure 5:
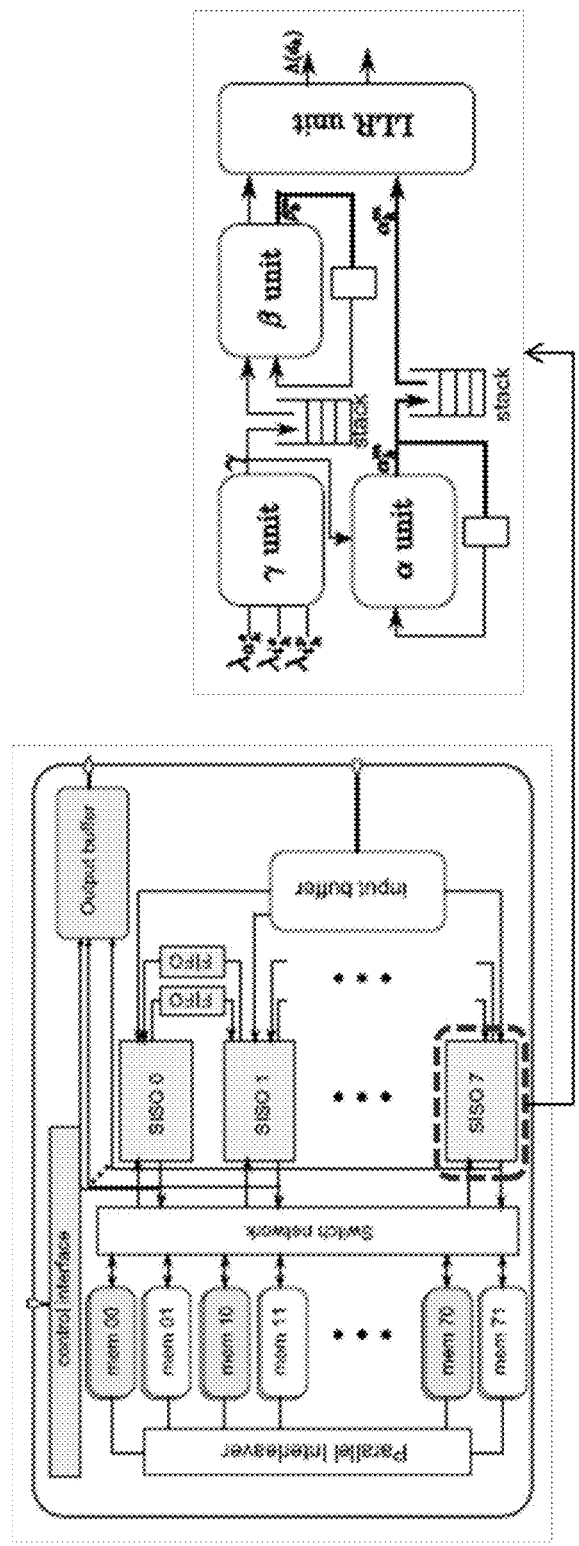
FIG. 5 shows an example of parallel decoding to reduce the processing time according to LTE/LTE-A system.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Procedures or steps probably making the point of the present invention unclear are skipped and procedures or steps understandable by those skilled in the art are also skipped as well.

In the present application, such a terminology as 'comprise', 'include' or the like should be construed not as excluding a different component but as further including the different component unless there is a special citation. And, in the present specification, such a terminology as ' . . . unit', ' . . . device', 'module' or the like means a unit for processing at least one function or an operation and can be implemented by a hardware, a software, or a combination thereof. Moreover, "a or an", "one", "the" or a similar related word can be used as a meaning including both a singular number and a plural number in the following contexts (in particular, in the following contexts of the claims) unless it is clearly contradicted to a context of the present invention.

In the present specification, the embodiments of the present invention are explained in a manner of mainly concerning data transmission and reception between a base station and a mobile station. In this case, the base station has a meaning of a terminal node of a network performing a direct communication with the mobile station. In the present disclosure, a specific operation, which is explained as performed by the base station, may be performed by an upper node of the base station in some cases.

In particular, in a network constructed with a plurality of network nodes including a base station, it is apparent that various operations performed for communication with a mobile station can be performed by the base station or other networks except the base station. 'Base station (BS)' may be substituted with such a terminology as a fixed station, a Node B, an eNode B (eNB), an advanced base station (ABS), an access point (AP) and the like.

And, a mobile station (MS) may be substituted with such a terminology as a user equipment (UE), a subscriber station (SS), a mobile station subscriber station (MSS), a mobile terminal (MT), an advanced mobile station (AMS), a terminal, and the like.

And, a transmitting end corresponds to a fixed and/or mobile node providing a data service or an audio service and a receiving end corresponds to a fixed and/or mobile node receiving the data service or the audio service. Hence, a mobile station becomes the transmitting end and a base station may become the receiving end in uplink. In the same manner, the mobile station becomes the receiving end and the base station may become the transmitting end in downlink.

And, when a device performs communication with a 'cell', it may indicate that the device transceives a signal with a base station of the cell. In particular, although the device actually transmits and receives a signal with a specific base station, for clarity, it may be represented as the device transmits and receives a signal with a cell formed by the specific base station. Similarly, a 'macro cell' and/or 'small cell' may indicate a specific coverage, respectively. Moreover, the 'macro cell' and/or the 'small cell' may indicate a 'macro base station supporting the macro cell' and a 'small cell base station supporting the small cell', respectively.

The embodiments of the present invention can be supported by standard documents disclosed in at least one of IEEE 802.xx system, 3GPP system, 3GPP LTE system and 3GPP2 system. In particular, unmentioned clear steps or parts of the embodiments of the present invention can be explained with reference to the aforementioned standard documents And, all terminologies disclosed in the present specification can be explained by the aforementioned standard document. In particular, embodiments of the present invention can be supported by at least one of a standard document of IEEE 802.16 including P802.16e-2004, P802.16e-2005, P802.16.1, P802.16p, and P802.16.1b.

In the following, preferred embodiment according to the present invention is explained in detail with reference to attached drawings. Detailed description disclosed together with the accompanying drawings is intended to explain not a unique embodiment of the present invention but an exemplary embodiment of the present invention.

Moreover, specific terminologies used in the embodiments of the present invention are provided to help understanding of the present invention and the use of the specific terminologies can be modified in a different form in a scope without departing from the technical idea of the present invention.

Figure 6:
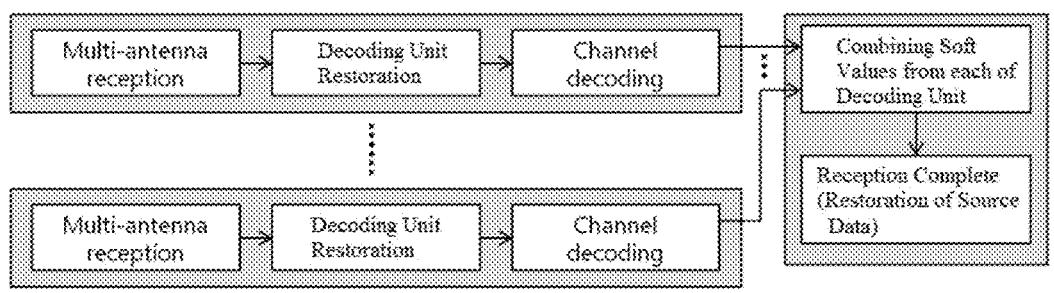
FIG. 6 shows exemplary structure for reception structure according to one embodiment of the present invention.

FIG. 6 shows exemplary structure for reception structure according to one embodiment of the present invention.

An embodiment of the present invention proposes a vehicular MIMO reception end to which a distributed and integrated antenna structure is applied in which DUs independently perform decoding operations and a CU collects decoding results to determine a final decoded bit, thereby reducing decoding delay through parallel decoding, instead of a legacy scheme of implementing a plurality of parallel decoding blocks in a single chip. More specifically, this embodiment proposes an integrated antenna based distributed antenna system reception end in which integrated antennas receiving signals through different channels by being distributively deployed share the decoding results in the form of a soft value rather than a hard value and obtain reception combining diversity gain through the shared decoding results.

As a detailed example, a scheme is proposed in which each DU (integrated antenna) performs decoding and transmits information about a probability that each decoded bit is 0 or 1 to a CU and the CU determines a decoded bit by collecting/interpreting the probability value. That is, as an example of sharing the soft value for the decoded bit, a scheme in which each DU reports a likelihood ratio or a log-likelihood ratio (LLR) to the CU may be considered.

Figure 7:
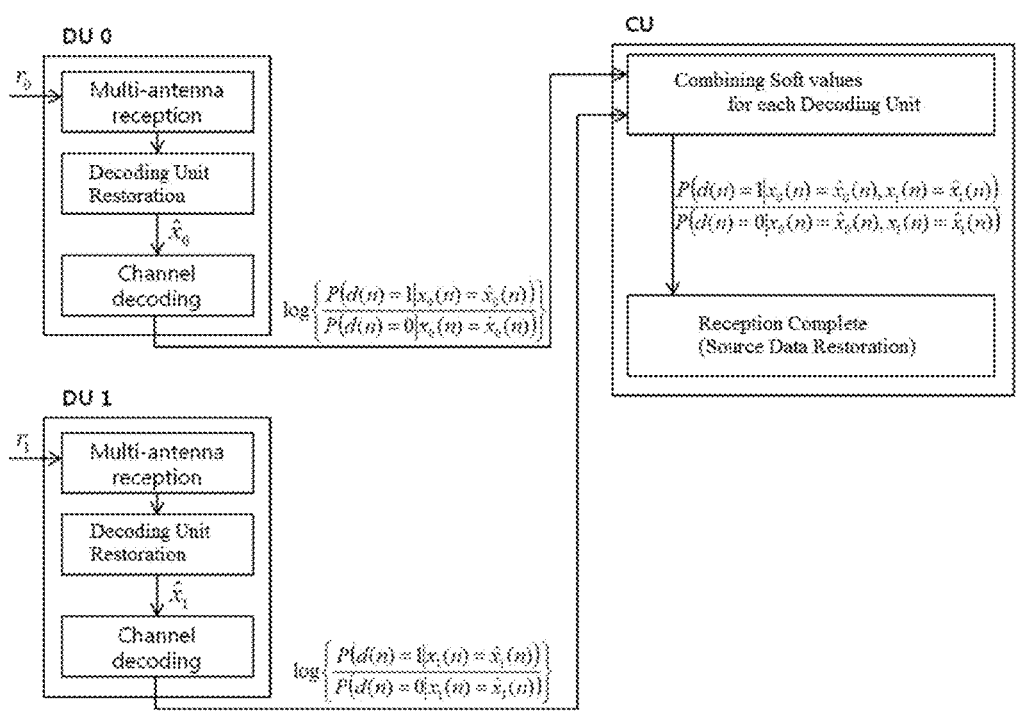
FIG. 7 shows an exemplary structure for sharing LLR between DUs and CU.

FIG. 7 shows an exemplary structure for sharing LLR between DUs and CU.

In FIG. 7, it is assumed that DU 0 and DU 1 receive one equal decoding unit having rank 1. In this case, according to the definition of an LLR, DU 0 reports a log value of the ratio of a probability that each decoded bit of a source data stream is 1 to a probability that each decoded bit of a source data stream is 0 to the CU as an LLR.

$$\log = \left\{ \frac{P(d(n) = 1 \mid x_0(n) = \hat{x}_0(n))}{P(d(n) = 0 \mid x_0(n) = \hat{x}_0(n))} \right\} \quad \text{[Equation 1]}$$

In this way, DU 1 reports a log value of the ratio of a probability that each decoded bit of a source data stream is 1 to a probability that each decoded bit of a source data stream is 0 to the CU as an LLR.

$$\log = \left\{ \frac{P(d(n) = 1 \mid x_1(n) = \hat{x}_1(n))}{P(d(n) = 0 \mid x_1(n) = \hat{x}_1(n))} \right\} \quad \text{[Equation 2]}$$

When the two DUs receive signals $r_0$ and $r_1$, a soft value that the CU should finally calculate is the ratio of a probability that a source bit corresponding to each signal is 1 to a probability that a source bit corresponding to each signal is 0. However, instead of directly calculating the ratio, if source bit estimation values when DU 0 and DU 1 complete decoding unit restoration operations such as multi-antenna reception and demodulation are $\hat{x}_0$ and $\hat{x}_1$, respectively, the CU calculates the ratio of a probability that a corresponding source bit is 1 to the probability that the source bit is 0 as indicated in Equation 3 and performs source bit restoration based on the calculated ratio.

$$\frac{P(d(n) = 1 \mid x_0(n) = \hat{x}_0(n), x_1(n) = \hat{x}_1(n))}{P(d(n) = 0 \mid x_0(n) = \hat{x}_0(n), x_1(n) = \hat{x}_1(n))} \quad \text{[Equation 3]}$$

As a method for obtaining the result of Equation 3, this embodiment uses Equation 1 and Equation 2 which are information transmitted by the two DUs. According to Bayer's rule, Equation 3 may be changed as follows.

$$\frac{P(d(n) = 1 \mid x_0(n) = \hat{x}_0(n), x_1(n) = \hat{x}_1(n))}{P(d(n) = 0 \mid x_0(n) = \hat{x}_0(n), x_1(n) = \hat{x}_1(n))} = \quad \text{[Equation 4]}$$

$$\frac{\dfrac{P(d(n) = 1) P(x_0(n) = \hat{x}_0(n), x_1(n) = \hat{x}_1(n) \mid d(n) = 1)}{P(x_0(n) = \hat{x}_0(n), x_1(n) = \hat{x}_1(n))}}{\dfrac{P(d(n) = 0) P(x_0(n) = \hat{x}_0(n), x_1(n) = \hat{x}_1(n) \mid d(n) = 0)}{P(x_0(n) = \hat{x}_0(n), x_1(n) = \hat{x}_1(n))}} = \dfrac{\dfrac{P(x_0(n) = \hat{x}_0(n), x_1(n) = \hat{x}_1(n) \mid d(n) = 1)}{P(x_0(n) = \hat{x}_0(n), x_1(n) = \hat{x}_1(n) \mid d(n) = 0)}}$$

In the above equation, it is assumed that a probability that each source bit is 0 or is equally 0.5.

In the above equation, when channel independency between DU 0 and DU 1 is big, for example, when the distance between the two DUs is long, radiation patterns of the two DUs are remarkably different, or a transmission beam is selected such that spatial correlation between the two DUs is small, it may be assumed that correlation between received signals of the two DUs is small and, in this case, the following equation is satisfied.

$$P(x_0(n) = \hat{x}_0(n), x_1(n) = \hat{x}_1(n)) = P(x_0(n) = \hat{x}_0(n)) \times P(x_1(n) = \hat{x}_1(n)) \quad \text{[Equation 5]}$$

If Equation 5 is substituted into Equation 4, the following equation is obtained.

$$\frac{P(d(n) = 1 \mid x_0(n) = \hat{x}_0(n), x_1(n) = \hat{x}_1(n))}{P(d(n) = 0 \mid x_0(n) = \hat{x}_0(n), x_1(n) = \hat{x}_1(n))} = \quad \text{[Equation 6]}$$

$$\frac{P(x_0(n) = \hat{x}_0(n) \mid d(n) = 1)}{P(x_0(n) = \hat{x}_0(n) \mid d(n) = 0)} \times \frac{P(x_1(n) = \hat{x}_1(n) \mid d(n) = 1)}{P(x_1(n) = \hat{x}_1(n) \mid d(n) = 0)}$$

If Bayer's rule is applied to Equation 6, Equation 6 is simplified as follows.

$$\frac{P(d(n) = 1 \mid x_0(n) = \hat{x}_0(n), x_1(n) = \hat{x}_1(n))}{P(d(n) = 0 \mid x_0(n) = \hat{x}_0(n), x_1(n) = \hat{x}_1(n))} = \quad \text{[Equation 7]}$$

$$\frac{\dfrac{P(x_0(n) = \hat{x}_0(n)) P(d(n) = 1 \mid x_0(n) = \hat{x}_0(n))}{P(d(n) = 1)} \cdot \dfrac{P(x_1(n) = \hat{x}_1(n)) P(d(n) = 1 \mid x_1(n) = \hat{x}_1(n))}{P(d(n) = 1)}}{\dfrac{P(x_0(n) = \hat{x}_0(n)) P(d(n) = 0 \mid x_0(n) = \hat{x}_0(n))}{P(d(n) = 0)} \cdot \dfrac{P(x_1(n) = \hat{x}_1(n)) P(d(n) = 0 \mid x_1(n) = \hat{x}_1(n))}{P(d(n) = 0)}} =$$

-continued $$\frac{P(d(n) = 1 \mid x_0(n) = \hat{x}_0(n))}{P(d(n) = 0 \mid x_0(n) = \hat{x}_0(n))} \times \frac{P(d(n) = 1 \mid x_1(n) = \hat{x}_1(n))}{P(d(n) = 0 \mid x_1(n) = \hat{x}_1(n))}$$

In Equation 7, it is assumed that a probability that each source bit is 0 or 1 is equally 0.5. If a log value is applied to both sides of Equation 7, a simplified equation may be obtained as follows.

$$\log\left\{\frac{P(d(n) = 1 \mid x_0(n) = \hat{x}_0(n), x_1(n) = \hat{x}_1(n))}{P(d(n) = 0 \mid x_0(n) = \hat{x}_0(n), x_1(n) = \hat{x}_1(n))}\right\} = \quad \text{[Equation 8]}$$

$$\log\left\{\frac{P(d(n) = 1 \mid x_0(n) = \hat{x}_0(n))}{P(d(n) = 0 \mid x_0(n) = \hat{x}_0(n))}\right\} +$$

$$\log\left\{\frac{P(d(n) = 1 \mid x_1(n) = \hat{x}_1(n))}{P(d(n) = 0 \mid x_1(n) = \hat{x}_1(n))}\right\}$$

That is, a final likelihood value may be acquired by simply summing LLRs transmitted by the two DUs. The CU may determine whether a resource value is 0 or 1 based on the likelihood value. In summary, when a value corresponding to a source bit 'n' among LLR values transmitted by DU 'k' is $l_k(n)$, a source bit restoration algorithm may be defined as follows.

$$\Sigma l_k(n) > 0 : d(n) = 1 \; \Sigma l_k(n) < 0 : d(n) = 0 \quad \text{[Equation 9]}$$

An embodiment of the present invention proposes a scheme of differentially adjusting a traffic amount used when each DU transmits an LLR value to the CU by comparing multi-antenna reception reliability of each DU.

A scheme of obtaining DU combining gain by sharing an LLR value between a DU and a CU has an advantage of acquiring multi-DU configuration gain while reducing hardware implementation burden by distributing reception processes. However, since respective DUs should transmit LLRs which are soft value information about each source bit to the CU, cable traffic between the DUs and the CU may be excessive. For example, when the DUs receive a source bit at a speed of 100 Mbps and transmit LLR values quantized to 64 bits to the CU with respect to each source bit, the DUs should report the LLR values to the CU through a cable at a speed of 6.4 Gbps. Such increase in cable traffic may be more serious when two or more DUs are connected to the CU through the same cable for implementation convenience as illustrated in FIG. 8(*a*) and FIG. 8(*b*).

Figure 8:
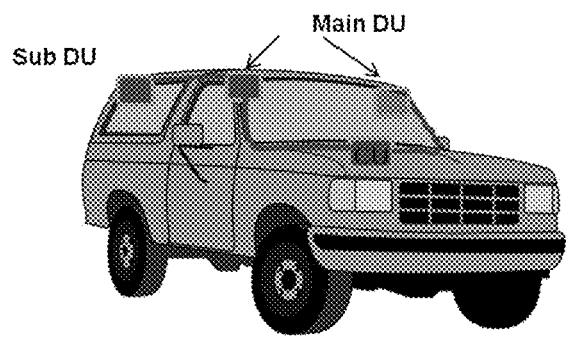
FIG. 8 shows exemplary in-vehicle DAS system to implement the present invention.
Figure 8:
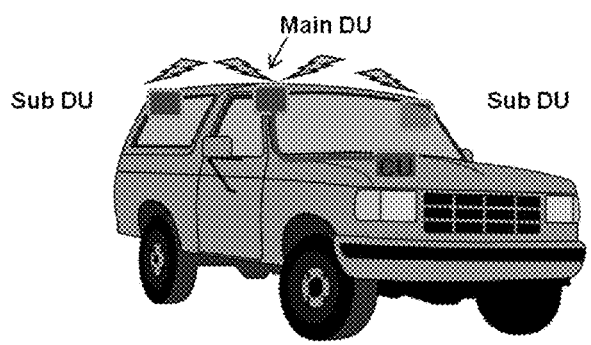

FIG. 8 shows exemplary in-vehicle DAS system to implement the present invention.

Specifically, FIG. 8 shows that multiple DUs have hierarchical structure, where the multiple DUs have one or more main DU and one or more sub DUs. FIG. 8(*a*) shows an example where DUs are connected via wire cable, while FIG. 8(*b*) shows an example where DUs are connected via wireless connection.

In the structure shown in FIG. 8, the signaling overhead can be a problem. Accordingly, a method of reducing transmission traffic of each DU may be needed. To achieve this method, the present invention proposes a scheme of controlling the amount of transmission traffic for each DU based on multi-antenna reception reliability of each DU.

Figure 9:
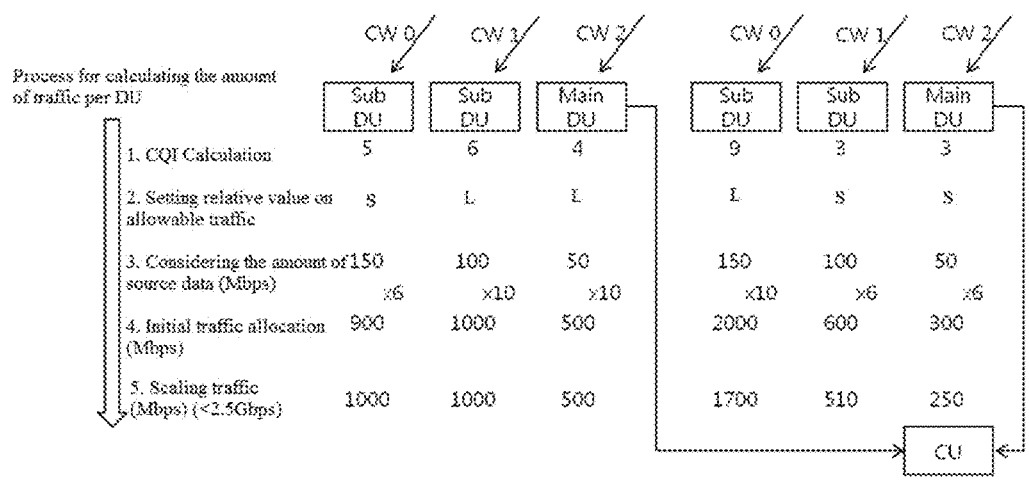
FIG. 9 shows an example of the present invention to calculate the amount of traffic for each DU based on the reception reliability.

FIG. 9 shows an example of the present invention to calculate the amount of traffic for each DU based on the reception reliability.

For convenience, it is assumed in FIG. 9 that each DU is configured to receive only one decoding unit (e.g. a codeword, a layer, etc.) or to transmit only an LLR value of one decoding unit. It is also assumed that a received signal to noise ratio (SNR) (or channel quality indicator (CQI)) is used after beamforming gain is applied, as a criterion of multi-antenna reception reliability.

In FIG. 9, the decoding unit is assumed to be a codeword and each codeword is received through two DUs. Each DU measures multi-antenna reception reliability and reports information about the measured reliability to a CU. The CU receives the same codeword by comparing multi-antenna reception reliability values of respective DUs and calculates cable traffic relative values with respect to the DUs that request LLR value reporting. In the example of FIG. 9, final traffic values of the DUs are determined in the following order.

1. Each DU calculates reception reliability including SNR gain caused by multi-antenna transmission and reception such as beamforming gain and reports information about the reception reliability to a CU.

For DUs that request LLR reporting on codewords 0 to 2, the CU sets relative values on allowable traffic based on the information of Number 1. For example, the relative values are distinguished by small (S) or large (L).

The CU calculates rates of respective codeword source data, i.e., minimum data rates necessary for LLR transmission, from a variety of information such as the sizes, modulation and coding scheme (MCS) levels, and assignment bandwidths of respective codewords.

In consideration of the relative values calculated in Number 2 and the minimum data rates calculated in Number 3, the CU calculates traffic amounts that the DUs are to use for LLR transmission to the CU. For example, if the relative value is "S" (small), a traffic amount corresponding to 6 times the minimum data rate is allocated to the data rate and, if the relative value is "L" (large), a traffic amount corresponding to 10 times the minimum rate is allocated to the data rate.

5. If the traffic amount allocated in Number 4 exceeds each cable capacity, the CU scales down the traffic amount.

Another embodiment proposes a scheme of adjusting a minimum and/or maximum value of an LLR value transmitted by each DU by differentially applying the minimum and/or maximum value according to reception reliability of each DU.

As one method for differential control of a traffic amount or a data rate used by each DU for LLR value transmission, each DU may differently set a minimum and/or maximum value of an LLR value upon calculation of the LLR value. For example, in FIG. 9:

* use of traffic corresponding to 10 times a minimum data rate: LLR minimum value=−511 and LLR maximum value=512, and

* use of traffic corresponding to 6 times a minimum data rate: LLR minimum value=−31 and LLR maximum value=31

As described above, the traffic amount used for LLR transmission may be adjusted by controlling the range of the LLR value.

The reason why the maximum and/or minimum value of the LLR is controlled according to reliability as described above is that case in which the LLR value has a value around the maximum or minimum value increases when reception reliability is high and the LLR value has a value approximating to 0 when reception reliability is low so that the frequency of transmitting a remarkably large or small LLR value decreases. That is, validity of the LLR value which is lost by restricting the range of the LLR value of a DL with low reliability may not be that great.

To support the above operation, the CU should be aware of information about a quantization level used by each DU to represent the LLR value, that is, information about (1) the number of bits used to represent one source bit and (2) a value (quantization size or maximum/minimum value) represented by each bit. The information may be shared between the CU and each DU in such a manner that the CU determines the information and notifies each DU of the information or the CU informs each DU when the DU transmits the LLR value to the CU.

Still another embodiment of the present invention proposes adjusting traffic of an LLR value transmitted by each DU by differently applying the quantization size of the LLR value transmitted by each DU according to reception reliability of each DU.

A scheme of reducing the number of digital bits used to represent each LLR value by adjusting the quantization size of the LLR value rather than the minimum/maximum value of the LLR value transmitted by each DU and thus reducing traffic necessary for LLR value calculation may also be applied. A detailed implementation scheme is the same as the above-described embodiment.

Figure 10:
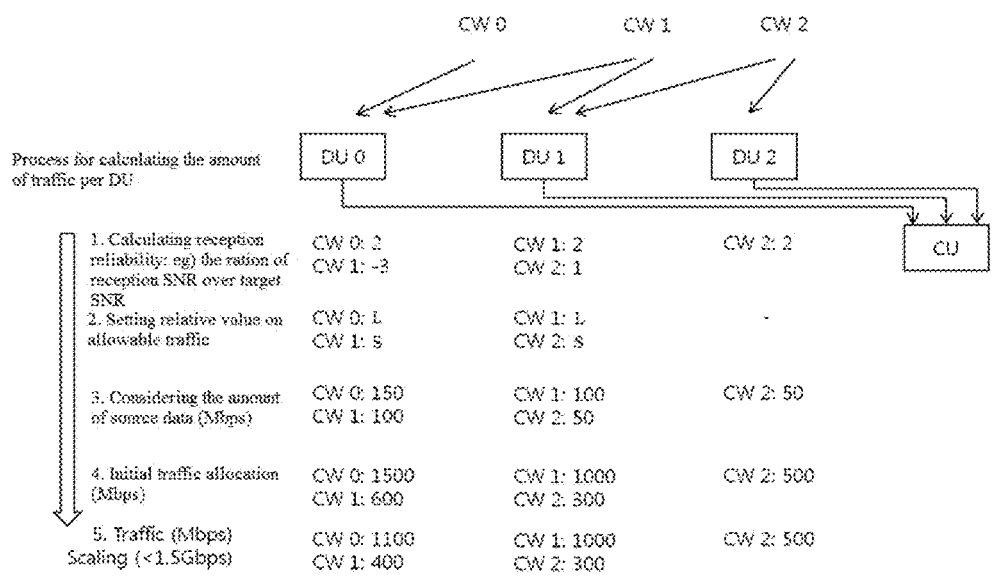
FIG. 10 shows an example when one DU receives multiple decoding units according to one example of the present invention.

FIG. 10 shows an example when one DU receives multiple decoding units according to one example of the present invention.

As a scheme applicable to a more generalized case, when each DU receives two or more decoding units, calculates LLR values for the decoding units, and transmits the LLR values to the CU, a scheme of differently adjusting a traffic amount necessary for LLR transmission with respect to each decoding unit in each DU may be used. As introduced in the above embodiment, the traffic amount for each decoding unit transmitted by the same DU may be controlled through differential comparison of multi-antenna reception reliability values or LLR reliability values of respective decoding units in a manner of differently applying (1) a traffic amount allocated for transmission of each decoding unit and (2) a quantization level of an LLR value. In FIG. 10, it is assumed that a decoding unit is a codeword in the example of the above scheme.

Figure 11:
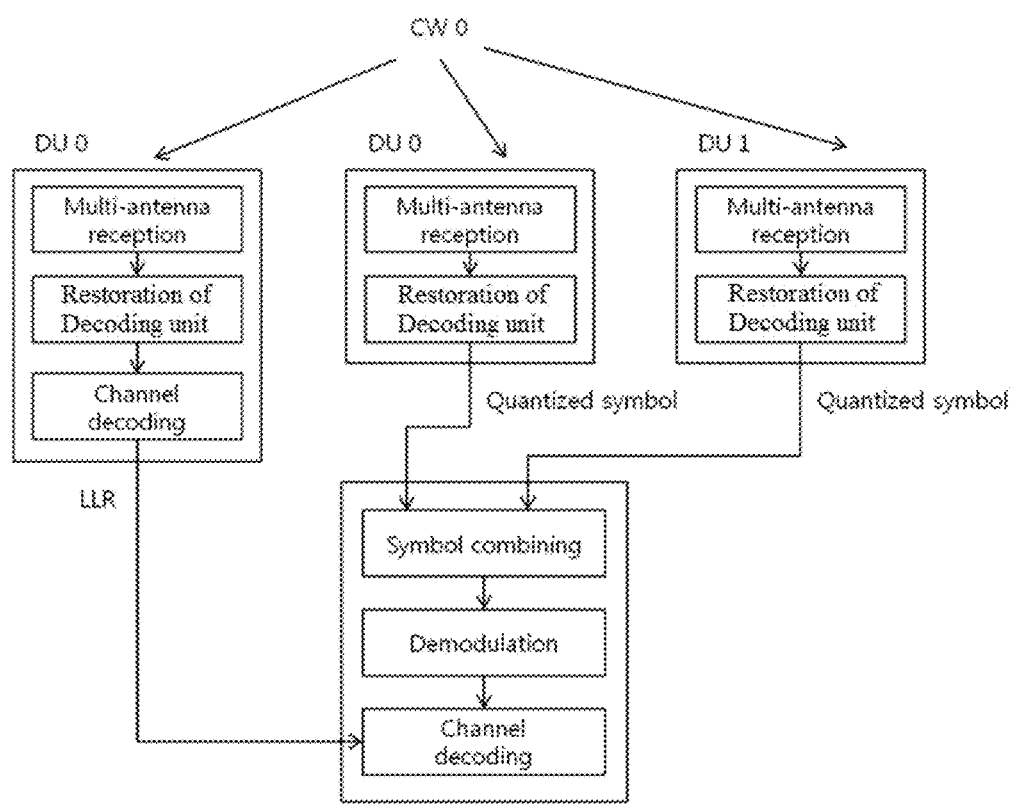
FIG. 11 shows an example of the present invention for explaining the combination of each of the above examples.

FIG. 11 shows an example of the present invention for explaining the combination of each of the above examples.

In FIG. 11, a hybrid scheme in which a part of DUs transmit LLR values and the other part of the DUs transmit quantized values of symbols/bits prior to decoding is implemented.

Application of the present invention is not limited to the case in which all DUs transmit signals of the same form and/or the same format to a CU and the present invention is applicable to a scheme in which DUs transmit signals of different forms and/or different formats to the CU, for example, some DUs transmit LLR values to the CU and the other DUs transmit modulated symbols, channel coded bits, or hard decision values to the CU.

In FIG. 11, it is assumed that DU 0 to DU 2 receive the same decoding unit, for example, codeword 0 and DU 0 has high multi-antenna reception reliability, whereas DUs 1 and 2 have low multi-antenna reception reliability. In this case, DU 0 calculates an LLR value and transmits the LLR value to the CU and DU1 and DU2 calculate quantized values of modulated symbols instead of LLR values and transmit the quantized values to the CU. The CU raises symbol detection reliability by combining the two modulated symbols, (2) ensures primary estimation of channel coded bits by performing demodulation on the symbols, (3) decodes the channel coded bits and uses the LLR value reported by DU 0 as an LLR initialization value, and (4) restores source data with a higher probability through the above three operations.

Even in the operations of the above scheme, a traffic amount for each codeword, transmitted by each DU, may be adjusted by applying the schemes proposed in the above embodiments.

In the embodiments of the present invention, although "integrated antenna" means a form in which an antenna and a processor performing a restoration function of partial data are integrated into one physical unit, technology of the present invention may be applied regardless of such a physical implementation method. For example, an antenna unit and a digital processor unit may be separately implemented as physically separated units. That is, the technology of the present invention assumes a distributed antenna unit structure in terms of a functional aspect rather than an implementation aspect.

While the present invention has been described and illustrated herein with reference to the preferred embodiments thereof, it will be apparent to those skilled in the art that various modifications and variations can be made therein without departing from the spirit and scope of the invention. Thus, the disclosed methods should be considered in an explanatory viewpoint instead of a limitative viewpoint. The scope of the present invention is shown at not the detail description of the invention but the appended claims. Thus, it is intended that the present invention covers the modifications and variations of this invention that come within the scope of the appended claims and their equivalents.

While the present document mainly discuss this with the example of implementing in-vehicle DAS system, it is only exemplary, and the proposed scheme/structure can be used for other configuration of MIMO system with distributed antennas.

What is claimed is:

1. A method for a user equipment (UE) implemented on a motor vehicle to receive signals from a network, the method comprising:
   receiving a decoding unit, from the network, by multiple distributed units (DUs) independently having decoding capability and distributed within the motor vehicle;
   decoding the decoding unit, at each of the multiple DUs;
   reporting, by each of the multiple DUs, first information on a result of the decoding comprising reliability information of the decoding unit to a central unit (CU) controlling the multiple DUs;
   determining, at the CU, a minimum amount of traffic to be received through communication means in the motor vehicle from each of the multiple DUs based on the reliability information;
   reporting, by each of the multiple DUs, second information on the decoding result having the determined minimum amount of traffic to the CU; and
   determining, at the CU, decoded bit values of the decoding unit based on the second information,
   wherein the multiple DUs have a hierarchical structure such that one or more DUs among the multiple DUs are main DUs, each of the main DUs being connected to one or more sub DUs.

2. The method of claim 1, wherein the first information comprises a log-likelihood ratio (LLR) of the decoding unit, and
   wherein the CU determines the decoded bit values of the decoding unit based on the LLR of the decoding unit received from the multiple DUs.

3. The method of claim 1, wherein the minimum amount of traffic to be received from each of the DUs is determined by considering the reliability information, required minimum amount of data for determining the decoded bit values, and a cable capability.

4. The method of claim 1, wherein the second information on the decoding result having the determined minimum amount of traffic is log-likelihood ratio (LLR) of the decoding unit having different ranges based on the minimum determined amount of traffic.

5. The method of claim 1, wherein the second information on the decoding result having the determined minimum amount of traffic is log-likelihood ratio (LLR) of the decoding unit having different quantization size based on the minimum determined amount of traffic.

6. The method of claim 1, wherein, in case one of the multiple DUs receives two or more decoding units from the network, the one of the multiple DUs reports the first information on the decoding result for each of the two or more decoding units to the CU, and
  wherein sizes of the first information for each of the two or more decoding units are differently determined based on reliability information of each of the two or more decoding units.

7. The method of claim 1, wherein the decoding unit is one of a codeword or a layer of signals from the network.

8. A user equipment (UE) implemented on a motor vehicle the UE comprising:
  multiple distributed units (DUs), each of which includes one or more integrated antennas to receive signals from a network and receive a decoding a unit from the network to independently decode the signals; and
  a central unit (CU) connected to the multiple DUs and controlling the multiple DUs,
  wherein each of the multiple DUs is configured to report first information on a result of decoding of a decoding unit of the received signals to the CU, the first information comprising reliability information of the decoding unit,
  wherein the CU is configured to determine a minimum amount of traffic to be received through communication means in the motor vehicle from each of the multiple DUs based on the reliability information, and to determine decoded bit values of the decoding unit based on second information reported from each of the multiple DUs based on the determined minimum amount of traffic, and
  wherein the multiple DUs have a hierarchical structure such that one or more DUs among the multiple DUs are main DUs, each of the main DUs being connected to one or more sub DUs.

9. The UE of claim 8, wherein each of the integrated antennas comprises an antenna component to receive the signals, and a processor for decoding the signals.

10. The UE of claim 8, wherein the CU comprises a processor configured to determine the decoded bit values based on a log-likelihood ratio (LLR) of the decoding unit acquired from the multiple DUs.

* * * * *